(12) United States Patent
Lamberts et al.

(10) Patent No.: US 11,593,204 B2
(45) Date of Patent: Feb. 28, 2023

(54) FLEET HEALTH MANAGEMENT DEVICE CLASSIFICATION FRAMEWORK

(71) Applicant: Western Digital Technologies, Inc., San Jose, CA (US)

(72) Inventors: Bernd Lamberts, San Jose, CA (US); Jeffrey Hobbet, Holly Springs, NC (US); Maulik Thaker, San Jose, CA (US); Evan Richardson, Rochester, MN (US); Remmelt Pit, Menlo Park, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/332,552

(22) Filed: May 27, 2021

(65) Prior Publication Data
US 2022/0382633 A1      Dec. 1, 2022

(51) Int. Cl.
*G06F 11/00*      (2006.01)
*G06F 11/10*      (2006.01)
(Continued)

(52) U.S. Cl.
CPC ........ *G06F 11/1084* (2013.01); *G06F 11/076* (2013.01); *G06F 11/0772* (2013.01); *G06F 11/0793* (2013.01); *G06F 11/3034* (2013.01)

(58) Field of Classification Search
None
See application file for complete search history.

(56) References Cited

U.S. PATENT DOCUMENTS

| 7,694,188 B2 | 4/2010 | Raghuraman et al. |
| 8,688,620 B2 | 4/2014 | Viswanathan et al. |

(Continued)

FOREIGN PATENT DOCUMENTS

| CN | 111104293 A | 5/2020 |
| JP | 2005258633 A | 9/2005 |

OTHER PUBLICATIONS

Shen, Jing et al., Hard Disk Drive Failure Prediction for Mobile Edge Computing Based on an LSTM Recurrent Neural Network, Hindawi, Mobile Information Systems, Revised Dec. 26, 2020; Accepted Jan. 19, 2021; Published Feb. 12, 2021, 12 pages, vol. 2021, Article ID 8878364.

(Continued)

*Primary Examiner* — Mujtaba M Chaudry
(74) *Attorney, Agent, or Firm* — John D. Henkhaus

(57) ABSTRACT

An approach to identifying a corrective action for a data storage device (DSD), such as one implemented in a fleet of DSDs in a data center, involves receiving error data about excursions from normal operational behavior of the DSD, inputting data representing a particular excursion into a probabilistic decision network which characterizes a set of DSD operational metrics and certain DSD controller rules that represent internal controls of the DSD and corresponding conditional relationships among the operational metrics, determining from the decision network the likelihood that one or more possible causes was a contributing factor to the particular excursion, and determining a corrective action for the particular excursion based on the determined likelihood of a particular cause of the one or more possible causes. The corrective action may then be shared with the DSD for in-situ execution of corresponding self-repair operations.

20 Claims, 6 Drawing Sheets

(51) Int. Cl.
  *G06F 11/07* (2006.01)
  *G06F 11/30* (2006.01)

(56) References Cited

U.S. PATENT DOCUMENTS

| | | | |
|---|---|---|---|
| 9,158,674 B2 | 10/2015 | Verhaeghe et al. | |
| 9,329,956 B2* | 5/2016 | Coatney | G06F 11/0727 |
| 9,450,876 B1 | 9/2016 | Marr | |
| 10,216,612 B1* | 2/2019 | Haney | G06F 11/0709 |
| 10,514,978 B1* | 12/2019 | Lee | G06F 11/3409 |
| 10,635,324 B1 | 4/2020 | Klein et al. | |
| 10,896,114 B2* | 1/2021 | Savanur | G06K 9/6282 |
| 2009/0177068 A1* | 7/2009 | Stivoric | A61B 5/0022 |
| | | | 600/365 |
| 2014/0006690 A1* | 1/2014 | Shin | G06F 3/0638 |
| | | | 711/103 |
| 2015/0046756 A1 | 2/2015 | Sreekumaran et al. | |
| 2019/0176838 A1* | 6/2019 | Kakoee | B60W 50/0205 |
| 2020/0104200 A1* | 4/2020 | Kocberber | G06N 3/082 |

OTHER PUBLICATIONS

Aggarwal, Nitin et al., Google Cloud and Seagate: Transforming hard-disk drive maintenance with predictive ML, AI & Machine Learning, 7 pages, May 7, 2021, downloaded at https://cloud.google.com/blog/products/ai-machine-learning/seagate-and-google-predict-hard-disk-drive-failures-with-ml.

Kumjeera, C. et al., A Failure Analysis Tool for HDD Analysis, World Academy of Science, Engineering and Technology International Journal of Electrical and Computer Engineering, 2011, pp. 1879-1883, vol. 5, No. 12, 2011.

Bonen, Yuval, Fleet Management of Data Center Electronics, Semiconductor Engineering Test, Measurement & Analytics, Aug. 11, 2020, 4 pages, downloaded from https://semiengineering.com/fleet-management-of-data-center-electronics/?web=1&wdLOR=c93A37D5E-A741-9F4A-962D-CD77697C900B.

Sunbird Software, Inc., What is Data Center Monitoring, 10 pages, downloaded from https://www.sunbirddcim.com/what-data-center-monitoring as early as Jan. 22, 2021.

Hewlett Packard Enterprise Development LP, HPE Datacenter Care Service, HPE Pointnext Services, Feb. 2019, 28 pages, downloaded from https://h20195.www2.hpe.com/v2/GetPDF.aspx/4AA4-0459ENW.pdf.

Wang, Yufei et al., Measurement and Analysis of SSD Reliability Data Based on Accelerated Endurance Test, Electronics 2019, 8, 1357, Accepted: Nov. 12, 2019; Published: Nov. 16, 2019, 19 pages, downloaded from https://www.mdpi.com/2079-9292/8/11/1357/htm.

* cited by examiner

FLEET HEALTH MANAGEMENT DEVICE CLASSIFICATION FRAMEWORK

FIELD OF EMBODIMENTS

Embodiments of the invention may relate generally to data storage devices, and particularly to approaches to assessing and managing exception events associated with a fleet of data storage devices.

BACKGROUND

As networked computing systems grow in numbers and capability, there is a need for more storage system capacity. Cloud computing and large-scale data processing further increase the need for digital data storage systems that are capable of transferring and holding significant amounts of data. One approach to providing sufficient data storage in data centers is the use of arrays of data storage devices. Many data storage devices can be housed in an electronics enclosure (sometimes referred to as a "rack"), which is typically a modular unit that can hold and operate independent data storage devices in an array, computer processors, routers and other electronic equipment. Data centers typically include many rack-mountable data storage devices that are used to store the large amounts of data, often referred to as a "fleet".

Increasingly, data center operators are in need of assistance with operating their fleet of storage devices. One of the most common challenges associated with operating a data center is the assessment and management of exception events within the data center.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Approaches to assessing and managing exception events within a fleet of data storage devices are described. In the following description, for the purposes of explanation, numerous specific details are set forth to provide a thorough understanding of the embodiments of the invention described herein. It will be apparent, however, that the embodiments of the invention described herein may be practiced without these specific details. In other instances, well-known structures and devices are shown in block diagram form to avoid unnecessarily obscuring the embodiments of the invention described herein.

Figure 2:
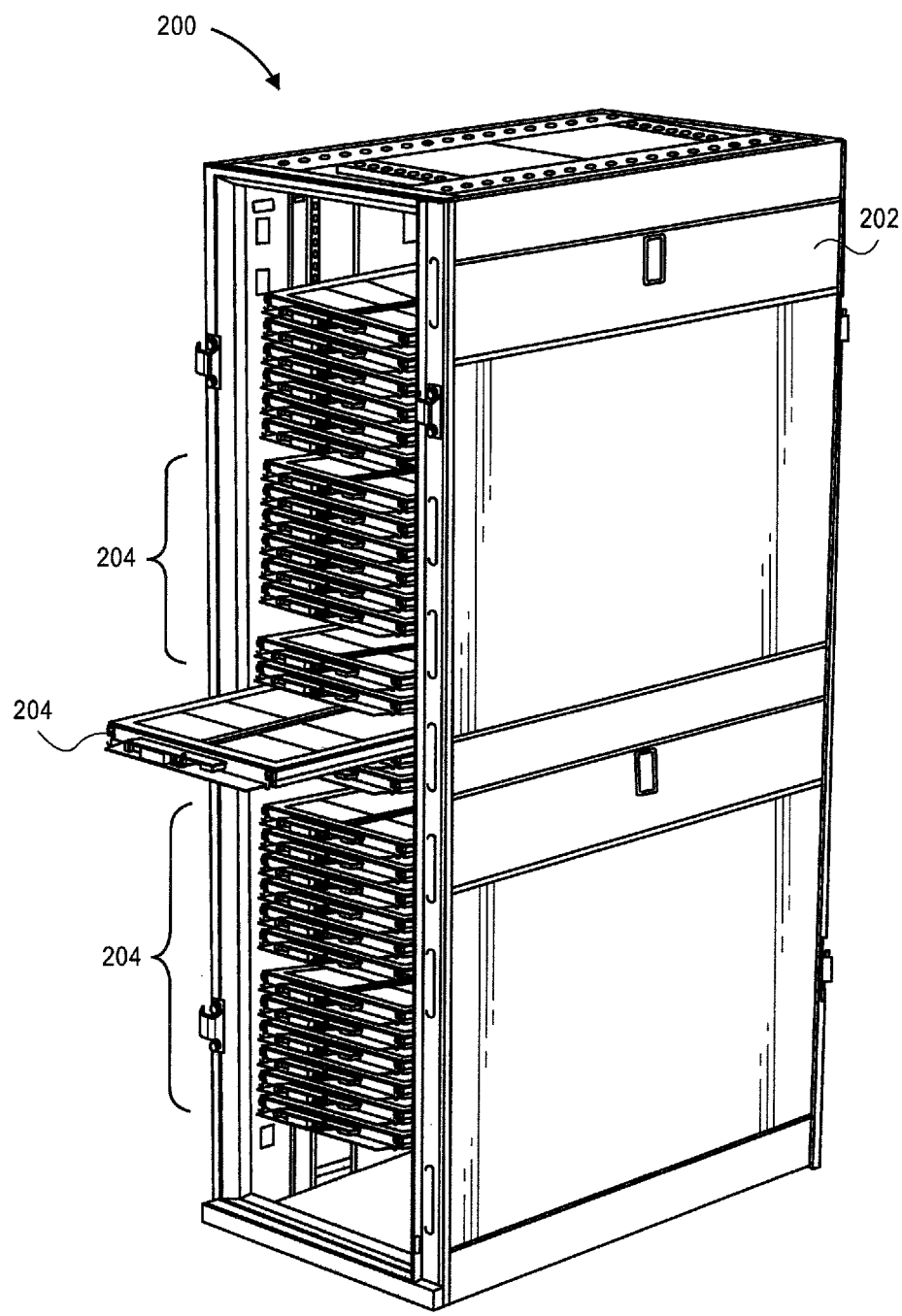
FIG. 2 is a perspective view illustrating a data storage system, according to an embodiment.

Physical Description of an Illustrative Operating Context-Data Systems and Data Centers There is a commercial demand for high-capacity digital data storage systems, in which multiple data storage devices (DSDs), such as hard disk drives (HDDs), solid-state drives (SSDs), tape drives, hybrid drives, and the like are housed in a common enclosure. Data storage systems often include large enclosures that house multiple shelves on which rows of DSDs are mounted. FIG. 2 is a perspective view illustrating an example data storage system, according to embodiments. A data storage system 200 may comprise a system enclosure 202 (or "rack 202"), in which multiple data storage system trays 204 are housed. Each tray 204 may be placed or slid into a corresponding slot within the rack 202, for example. Rack 202 further houses a system controller, and may further house switches, storage server(s), application server(s), a power supply, cooling fans, etc.

A data storage system is typically communicatively coupled with a host, which may be embodied in a hardware machine on which executable code executes (for non-limiting examples, a computer or hardware server, and the like), or as software instructions executable by one or more processors (for non-limiting examples, a software server such as a database server, application server, media server, and the like). A host generally represents a client of the data storage system and, therefore, has the capability to make read and write requests (input/output or "I/O") to the data storage system. Note that controllers at various levels of a storage system architecture may also be referred to as a "host" because the term is often generally used in reference to any device that makes I/O calls to a DSD or an array of devices.

Generally, a data center may be likened to an extreme version of a data storage system (or multiple data storage systems working together), along with the power, cooling, space, and the like needed to operate the storage, management, and sharing of data as well as the corresponding network infrastructure (e.g., routers, switches, firewalls, application-delivery controllers, and the like). Expanding on that notion, a "hyperscale" data center generally refers to a facility providing robust, scalable applications and storage services to individuals or other businesses. Exemplary implementations of hyperscale computing include cloud and big data storage, web service and social media platforms, enterprise data centers, and the like, which may consist of thousands of servers linked by an ultra-high speed fiber network. Because businesses depend on the reliability and constant functionality of all sizes and forms of data centers, the security and reliability of a data center are paramount concerns.

An example data storage system may comprise multiple DSDs such as HDDs and/or SSDs, each communicative with and under the control of a system controller via a communication interface according to a corresponding communication protocol. Each DSD would include corresponding non-volatile memory (NVM) (e.g., typically in the form of spinning magnetic disk media in the case of HDDs) controlled by a respective device controller, which typically includes a log module. Each log module is capable of logging actions taken by the device controller, such as logging of read, write, and seek errors, associated recovery actions, and other near-term and long-term DSD status information, where all may be referred to as "exception events". A log module may be, for example, constituent to a corresponding system on chip (SoC), such as part of the data channel circuitry or the hard disk controller circuitry, in the context of an HDD.

For example, SCSI (Small Computer System Interface) devices return error codes referred to as Key Code Qualifiers (KCQs), which represent error conditions associated with the corresponding device. Furthermore, HDDs may be implemented with SMART (Self-Monitoring, Analysis, and Reporting Technology), i.e., a common monitoring system included in an HDD that reports on various attributes of the state of the HDD. Still further, HDDs may be implemented with the functionality of an "E6" log, which refers to a vendor-unique implementation of a binary log file used to snapshot the state of an HDD. Reference to an "E6 log" may be used herein as a generalized reference to one of multiple possible protocols to access such a log. Here, an E6 log contains a large number (tens) of sub-sections and is typically in the size range (order of magnitude) of 10 MB to 100 MB, depending on which groups of sections are fetched. For example, such a log may be comprised of multiple tables with a range of different data layouts, such as time series, histograms, key value pair, stateful table, and the like. There is also an incremental E6 log capability, which only fetches state that is "new", i.e., since the most recent full or incremental fetch. The sections of an E6 log may have various themes/purposes, and some are fixed size and some grow over time as more drive activities accumulate. Furthermore, some of the data elements are retained for the life of the drive, and some wrap, with the HDD autonomously deleting older state to avoid exceeding a size boundary ceiling.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment, If used herein, the term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Recall that one of the most common challenges associated with operating a data center is the assessment and management of exception events within the data center. Common questions are whether a given set of devices for a given storage rack operate to specifications or whether any given device impacts data center operations. A common approach is the application of an array of disconnected SER (seek error rate) and exception measurements most often associated with hard failure thresholds. These metrics typically approach the question from a device-centric view, such as by counting device events.

Some data storage systems implement diagnostic and in-situ (e.g., "in place" or "in position") repair procedures. This means that system HDDs that have failed during operation in the field are diagnosed and fixed in the field to the extent possible, and if they cannot be fixed, they are retired in place rather than replaced. Preferably, in-situ repairs entail automated or semi-automated procedures, while the HDD of interest remains in the system enclosure. Many HDD repairs do not result in any loss of capacity or performance. An HDD may be repaired in a way that still enables continued use by system software, albeit possibly with reduced capacity or performance. An HDD that cannot be repaired may be allowed to fail in place within the system, such as in scenarios in which the system was shipped with over-provisioned storage capacity that permits availability of the full, specified storage capacity despite a number of drive failures. In-situ repair can eliminate the cost of scheduling service technicians to replace drives that fail in the field, as well as the cost of those replacement drives. Additionally, in-situ repair can reduce the AFR (annual failure rate) of storage devices, and will likely eliminate the ARR (annual return rate) as future product releases adopt a "fail-in-place" model. Analysis of failed drives shows that many HDDs that fail in the field can be restored to full or partial usage with relatively uncomplicated techniques.

Knowledge-Based Fleet Health Management Approach to Developing Actionable In-Situ Corrective Actions Processing, functions, procedures, actions, method steps, and the like, that are described herein may include enactment by execution of one or more sequences of one or more instructions stored in one or more memory units and which, when executed by one or more processors, cause such performance. Referenced controllers may be embodied in any form of and/or combination of software, hardware, and firmware, such as an application-specific integrated circuit (ASIC) comprising at least one memory unit for storing such instructions and at least one processor for executing such instructions.

Figure 3:
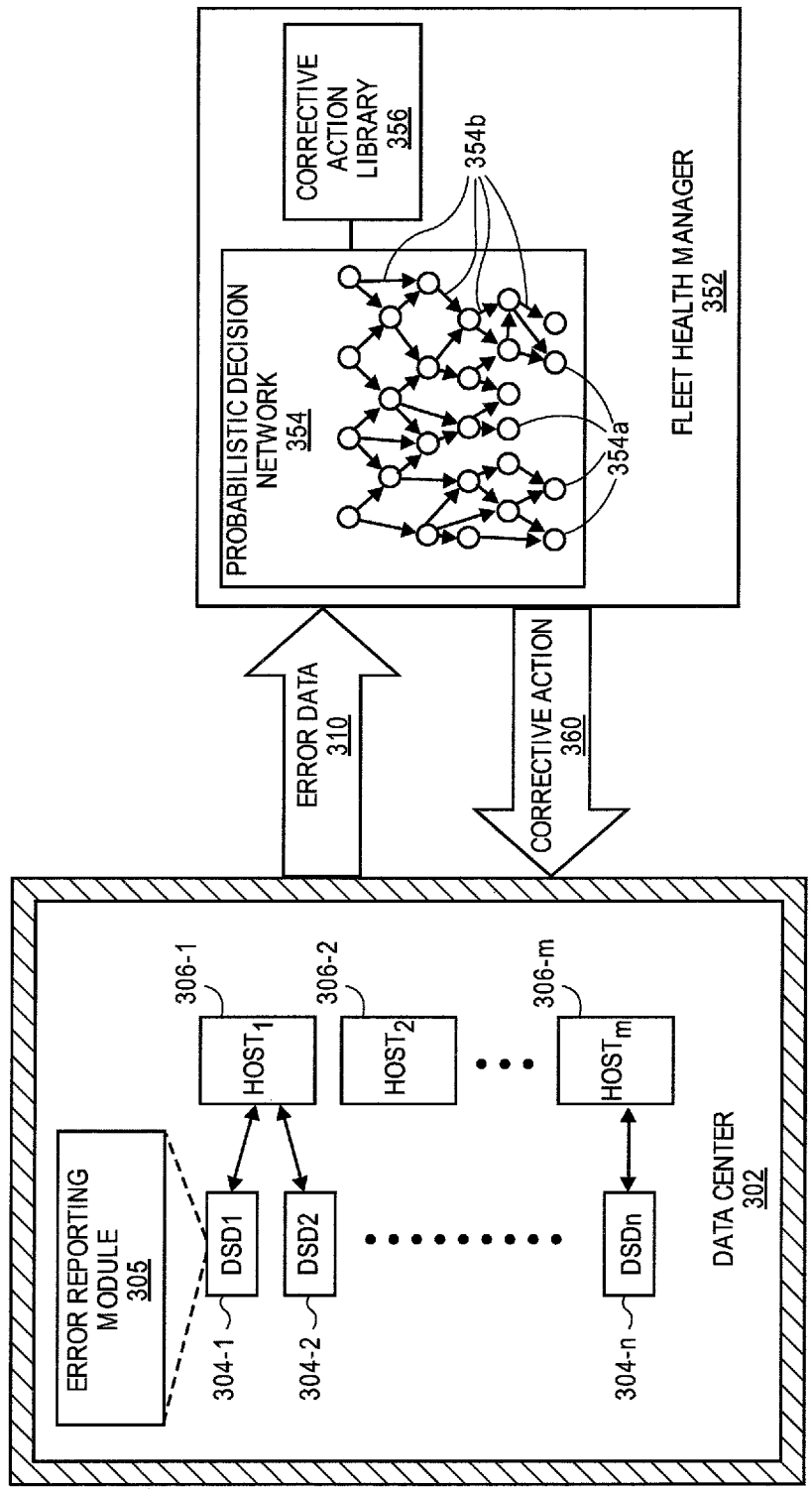
FIG. 3 is a block diagram illustrating a context in which a data storage device fleet health management application may be implemented, according to an embodiment.

FIG. 3 is a block diagram illustrating a context in which a data storage device fleet health management application may be implemented. FIG. 3 graphically depicts a data center 302 communicatively coupled with a fleet health manager 352 (or simply "FHM 352"). Data center 302 comprises multiple data storage devices (DSDs) 304-1, 304-2 through 304-n (collectively, "DSDs 304"; generally and singularly, "DSD 304"), where n represents an arbitrary number of HDDs and/or SSDs that may vary from implementation to implementation but is essentially limitless.

Each of these DSDs 304 is communicatively coupled with and under some control of one or more hosts 306-1, 306-2 through 306-*m* (collectively, "hosts 306"; generally and singularly, "host 306"), where m represents an arbitrary number of hosts that may vary from implementation to implementation. One non-limiting example of a type of host is an application server. Typically, a single host such as 306-1 is configured to control multiple DSDs 304, so the number of DSDs 304 would outnumber the number of hosts 306.

Device Error Reporting

Each of the DSDs 304 is configured with error reporting module 305 functionality which, as described elsewhere herein as a log module, is capable of logging actions taken by the device controller, such as logging of read, write, and seek errors, associated recovery actions, and other near-term and long-term DSD status information. As such, each of the DSDs 304 can report out internal error data such as Key Code Qualifiers (KCQs), SMART (Self-Monitoring, Analysis, and Reporting Technology) state metrics, and "E6 log" state metrics (described in more detail elsewhere herein), for non-limiting examples. This error data characterizes excursions from "normal" operational behavior of each corresponding DSD 304, and is typically reported out by each of the DSDs 304 to its corresponding host(s) 306, where it may be translated and/or transformed into a different format. For example, in view of the strict security protocols typically associated with a data center such as data center 302, the hosts 306 may transform binary error data from a DSD 304 into a human-readable, non-executable, secure format before transmission outside of the data center 302. The error data from each error reporting module 305 of DSD 304 is represented in some form and transmitted out of the data center 302 in the form depicted as error data 310.

Terms involving "error" used herein are not necessarily intended to strictly limit the applicability of the described techniques to the use of errors events, per se. Rather, device state and device use tracking may also be employed, such as with the objective of optimizing data flow to and from a DSD, tracking temperature or other environmental conditions related to a DSD, and the like, for non-limiting examples. Thus, "error" reporting module is intended to also encompass non-error device use, productivity, state, and the like.

Fleet Health Manager

Fleet health manager 352 comprises a probabilistic decision network 354 (or simply "decision network 354") and a corrective action library 356. While the fleet health manager 352 may run on a server external to the data center 302, as depicted, according to an embodiment the fleet health manager 352 runs on a server internal to the data center 302, such as in a controlled secure customer application area of the data center 302. The decision network 354 is designed, configured, programmed to characterize (i) a set of operational metrics (depicted as nodes 354*a* of decision network 354, also referred to as "operational metrics 354*a*") and (ii) certain DSD 304 controller rules (depicted as connecting lines 354*b* of decision network 354*b*, also referred to as "controller rules 354*b*") which represent internal controls of DSD 304 and/or corresponding conditional relationships among the operational metrics. According to an embodiment, the DSD controller rules 354*b* are implemented to include, but are not limited to, mathematical expressions of the internal algorithms used to control the operational behavior of DSD 304, i.e., by the internal DSD controller by way of algorithms embodied by and embedded in controller firmware logic, data, instructions, and the like.

According to an embodiment, the operational metrics 354*a* and the controller rules 354*b* are expressed within decision network 354 as a mathematical graph, i.e., a structure according to which some pairs of a set of objects or nodes are in some way related to each other. Here, the nodes or vertices represent and characterize the operational metrics 354*a* and the lines or edges or links represent and characterize the controller rules 354*b* which embody the relationships between and among the various operational metrics 354*a*. These relationships include but are not limited to the known and certain behavioral dependencies between and among the various operational metrics 354*a* of each of the DSDs 304 as manifested in the controller rules 354*b*, which may be in the form of differential equations which define the relationships between physical quantities represented as functions and their rates of change as represented by their respective derivatives, and/or represented in a state diagram or a graph (e.g., a decision tree), for examples. According to an embodiment, decision network 354 is considered and/or based on a Bayesian network, system, model, which is a probabilistic graphical model (e.g., a directed acyclic graph, or "DAG") that represents a set of variables and their conditional dependencies. As such, with reference to the concept of machine learning or predictive analytics, the controller rules 354*b* of decision network 354 may be "trained" with a training set(s) of data to make predictions or decisions without being specifically or explicitly programmed to do so. Hence, from the decision network 354 the likelihood or relative probability that one or more possible causes was a contributing factor to the particular excursion is determinable. For example, determining the likelihood that a possible cause was a contributing factor to the particular excursion includes traversing the probabilistic graphical model backwards from the node that corresponds to the operational metric 354*a* that corresponds to the particular excursion associated with and reported out from the particular DSD 304. Then, according to or based on the determined possible cause(s), a corresponding corrective action may be determined and selected from the corrective action library 356 for sharing with the particular DSD 304, such as via a corresponding host 306, to provide the DSD 304 with real actionable information to guide the DSD 304 in executing an in-situ repair to self-fix in the field to the extent possible.

It appears that the vast majority of known health management tools are born out of engineering efforts of the data storage device vendors, with the question being answered solely in the context of the device. However, on a system level what seems to matter most to data center operators is how the device impacts the system. Thus, the fleet health manager 352 described and illustrated herein invests significantly into translating device internal information into higher level information. That is, conceptually for example, by providing feedback that event x occurred, this further implies y for the future operation of the system because additional facts (w, u, v) are known (e.g., internal controller operational behavior algorithms), and data center operator customers may have provided boundary conditions (a, b).

Analysis has concluded that data center (e.g., data center 302) device requirements (e.g., DSDs 304) can be delineated as specific functional metrics. At a high level these functional metrics may be described and envisioned as productivity or efficiency, latency, device integrity, data integrity, and the like. The fleet health manager 352 framework provides "detectors" (or "sensors") which are specifically designed to measure those functional metrics, i.e., to measure the system impact regarding such metrics in the context of a specific device (e.g., the DSDs 304). This can be done using time series analysis based on a combination of multiple device logs. In the context of a fleet of devices, fleet health manager 352 is configured to utilize the perspective of any and all of the devices and, therefore, separation of device effects and system effects is possible. For example, similar device effects for multiple devices may be compared from a system impact viewpoint to identify, based on that comparison, a causal relationship via the decision network 354. Thus, fleet health manager 352 provides a detailed analysis of device events as experienced by the host, such as by determining the likelihood that a particular excursion from normal operating behavior of a particular DSD 304 impacts the future operational behavior of the DSD 304 in a manner having, or to the extent of, a noticeable effect on a host 306 (e.g., system impact) corresponding to the particular DSD 304.

According to an embodiment, the determination and sharing of a corrective action is conditioned upon the likelihood that the particular excursion does impact the future operational behavior of the DSD 304 in a manner having a noticeable effect on the host 306. Such an approach contrasts with conventional error rate-based metrics which may simply share information about error codes associated with device events, e.g., an array of disconnected SER and exception measurements most often associated with hard failure thresholds, rather than providing feedback on what such error codes imply and what to do about it, e.g., via a recommended corrective action from a library of possible corrective actions such as from corrective action library 356. Furthermore, with known health management applications, the analytical focus is primarily on a sole excursion event, such as a change in flying height of a hard disk drive slider housing the read-write head (or "read-write transducer"), for which a threshold is defined and for which a meaning may be assigned to an exception to that single threshold. However, the actual system behavior is a very complex combination of many individual system components and, therefore, a reported change in flying height can have a very different impact, or even no impact at all, on the functional behavior of the system. This can lead to complex hysteresis effects at the functional level and consequently can lead to poor decisions. Also recall that device utilization and productivity (e.g., throughput), for example, such as via the aforementioned device state and device use tracking, may further be employed to characterize the functional behavior of the system, in addition to or alternatively to excursion events.

Continuing with the flying height example to exemplify how fleet health manager 352 utilizes expert knowledge of the DSDs 304 to build more efficient and effective decision logic, it is possible that there was a real change in flying height, for which it is known that the servo system may react in one or more certain ways (as an example of the knowledge of the intrinsic, inherent operational behavior of the DSD 304), so the decision network 354 may be exercised to look for those certain ways that the servo system reacted to help with determining a cause of the reported flying height error. On the other hand, it is possible that the magnetic signal that is used to indirectly infer the flying height, which is a function of or dependent on a hardware sensor that is installed in the DSD 304 to "detect" the flying height (as another example of the knowledge of the intrinsic, inherent operational behavior of the DSD 304), misinterpreted the state of the DSD 304 based on faulty data from a faulty sensor, so the decision network 354 may be exercised to look at another metric(s) built into the decision network 354 that would indicate whether that sensor is failing.

Expanding the Context of the Excursion Event

According to an embodiment, fleet health manager generally and, decision network 354 particularly, is designed, configured, programmed to expand the decisional context of the particular excursion in determining the likelihood of a possible cause of the particular excursion, in various ways. One way in which the context is expanded is through interpretation of the history of what has happened in the past. According to an embodiment, prior probability distributions (or "Bayesian priors" or simply "priors") regarding one or more of the operational metrics 354a are considered which here, in essence, refers generally to the consideration of past data in addition to simply considering the data corresponding to the particular excursion.

In most cases in the context of using decision network 354 to determine a probable root cause of a behavioral excursion manifested as a reported error, to facilitate better and actionable corrective advice, the conclusion being sought is for when trends do not exist or are disrupted, e.g., by state changes. Here, the way error data and/or behavior patterns are actually interpreted may be based on past error data and/or past behavior, rather than simply identifying trends such as with classical time series analysis. Stated otherwise, a same observation (e.g., excursion event embodied in error reporting) may be treated in a different manner depending on the additional context of other variables, which may include for example, other metrics/excursions from the same device and/or the same or different metrics/excursions from a different device, and/or over different time scales if useful and appropriate, and/or other non-error device metrics desired for optimization techniques, and/or even with consideration to external environmental operating conditions and the like, to check metrics against each other to assist with determining what really occurred or what needs to occur in optimization scenarios. However, to accomplish the foregoing combination of different data, the different data needs to be related to each other in some manner, which is enabled through the multidimensional decision network 354 of operational metrics 354a (e.g., the "physics") related by controller rules 354b (e.g., the "knowledge"), to provide an efficient and concise model of the behavior of DSDs 304 to determine what may be expected behavior versus what may be unexpected behavior and the consequent functional system impact within the larger universe of the data center 302.

Another way in which the context is expanded is through the use of adaptive time scale analysis. Fleet health manager 352 identifies excursions and time series behavior. Most known health management applications are aware only of a single fixed scale. Analysis has shown that many data center processes can only be understood on multiple time scales (or at least different time scales for different processes), and by extension, that different data centers are sensitive to excursions at different time scales. Fleet health manager 352 supports this aspect via adaptive selection of time scales at which the decision analysis is performed. That is, fleet health manager 352 provides for assessing the impact on user-defined scales, to reflect specific timing requirements within a given data center implementation. Furthermore, by adjusting the time scale to the natural relevant scale process of the underlying process, data is used relatively efficiently as the data volume can be reduced and hence the cost can be reduced. Still further, device effects can be linked at different time scales. For example, there can be an event which occurs at time t1 on time scale T(a). Fleet health manager 352 may observe that in many cases this event is followed, with a certain likelihood, by a following event at t2 on time scale T(b).

Based on the foregoing, a use case may include inputting error data regarding a first excursion from a particular first process of normal operational behavior of a DSD 304, according to a relevant first time scale corresponding to the first process. Then further inputting error data regarding a second excursion from a particular second process of normal operational behavior of the DSD 304, or of another DSD, according to a relevant second time scale corresponding to the second process, where the first time scale is different from the second time scale. While the two excursions are represented for analysis by different time scales, the two different inputs representing the two excursions can be synchronized over a common time period, i.e., the two inputs have a fixed temporal relationship over which the analysis within decision network 354 may be performed.

Actionable Advice

As discussed, typical health management applications function to define a respective threshold for each of multiple metrics, assign a meaning to an exception to that threshold, and report that exception to a host, for example, for the data center operator to interpret and to derive a suitable responsive action. With fleet health manager 352 the output to the data center 302, depicted as corrective action 360, is expressed differently than with the typical health management applications. Here, the conclusions or decisions that are reached from exercising the decision network 354 are effectively translated into actionable advice or actionable items, selected from the corrective action library 356 based at least in part on the conclusion reached, and known and recognizable in one form or another by each DSD 304 and/or each host 306 (or each data center controller if applicable). Hence, the DSD 304 can identify the corrective action from the command it receives from its host 306, match the corrective action with executable code of fundamental repair operations stored within the DSD 304, and execute that code embodying an in-situ repair to the DSD 304. Additionally, the corrective action library 356 may be implemented in an expanded state, whereby improvement actions are available in addition to corrective action, for use in scenarios in which the fleet health manager 352 and its decision network 354 are employed to optimize or improve certain operational behavior(s) of one or more DSD 304 not necessarily in response to an excursion event.

The form and function that the corrective actions 360 may take may vary from implementation to implementation based on, for example, the type of DSDs 304 constituent to the data center 302 (e.g., HDDs, SSDs). The DSDs 304 that are constituent to a data center 302 can be considered sensitive sensors of factors that may affect the data integrity and reliability associated with each DSD 304, such as temperature, airflow, vibration, and the like in the context of HDDs, and age, storage cycles, and the like in the context of SSDs. Furthermore, HDDs may be sources of information regarding position error signals (PES) and the factors contributing thereto, Data Recovery Procedure (DRP) recovery operations, and the like, corresponding to a specific head or region of media. Hence, data integrity and recovery information that each DSD may be internally privy to, and combinations thereof, responsive to being shared with the fleet health manager 352, can provide a valuable expanded vision of the symptoms of data degradation at the device level, for use as an informed and efficient diagnostic, prognostic, and repair controlling point at the system level. There may also be additional information about the DSDs available at the system level, e.g., available to the host 306, that can contribute to and/or be combined to contribute to intelligent, predictive decision-making at the system level. For example, in the context of HDDs, the host 306 may be made privy to information such as the storage device form factor, the number of disks (and/or actuators), the disks' RPM (revolution per minute), and other common variations among HDD models, and possibly as well as the location of each storage device within a particular shelf and within the system rack (e.g., rack 202 of FIG. 2), relative proximity to fans, fan speed, relative proximity to heat sources, and other factors external to each device itself.

In determining a suitable corrective action corresponding to the conclusion reached, the fleet health manager 352 (e.g., via the decision network 354) is capable of bucketizing or characterizing excursions that it receives as represented by the error data 310 from the data center 302. For non-limiting examples, excursions may be characterized by an association with a corresponding general corrective action 360, for example, to ignore the excursion by doing nothing, to perform further data analysis on the DSD 304, to quarantine or fail the DSD 304 as the data stored thereon is no longer reliable, and the like. Furthermore, excursions may be characterized by an association with a more specific in-situ corrective action 360, for non-limiting examples, fleet health manager 352 may recommend a "head depop" (head depopulation) be performed on a particular read-write head, whereby the head is classified (e.g., to the host 306 and/or to the DSD 304 controller) as ineligible for use in further I/O operations, effectively disabled from further use/operation. Alternatively, an otherwise troublesome HDD may be reformatted to its current capacity. For example, in a scenario in which one or more heads have already been depopped in a prior repair operation and the decision was made not to depop another head at this time, then the HDD may be reformatted to its current capacity, taking into account the reduced capacity corresponding to the heads that were previously depopped. Furthermore, another repair option involves forcibly sparing out troublesome region(s) of media (e.g., marking the region(s) unavailable for further I/Os) rather than undertaking a longer and more complex reformat or depop repair.

Method for Identifying a Corrective Action for a Data Storage Device

Figure 4:
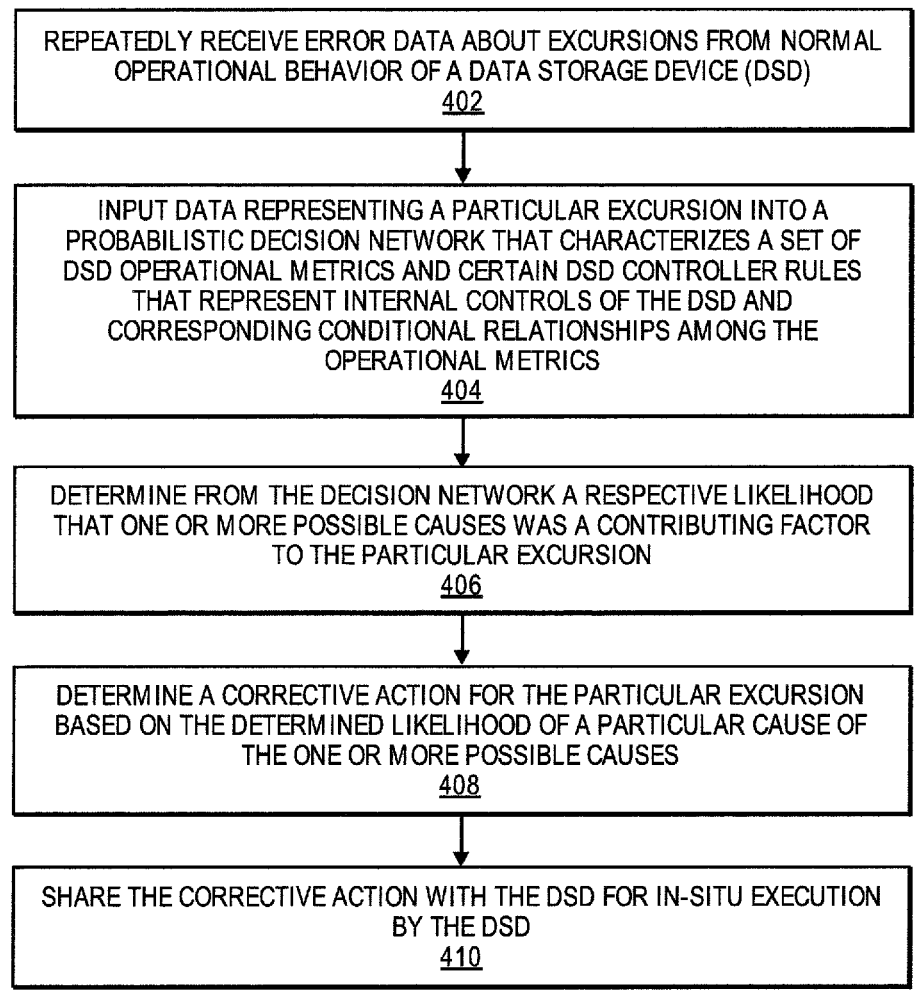
FIG. 4 is a flow diagram illustrating a method for identifying a corrective action for a data storage device, according to an embodiment.

FIG. 4 is a flow diagram illustrating a method of identifying a corrective action for a data storage device (DSD), according to an embodiment. The computing process or procedure of FIG. 4 may be implemented for execution as one or more sequences of one or more instructions stored in one or more memory units and which, when executed by one or more processors, cause performance of the process.

At block 402, error data about excursions from normal operational behavior of a DSD is repeatedly received. For example, fleet health manager 352 (FIG. 3) repeatedly extracts from data center 302 (FIG. 3), and/or data center 302 repeatedly pushes to fleet health manager 352, error data 310 (FIG. 3) largely originating from DSDs 304 (FIG. 3). For example, error data reported out from each error reporting module 305 (FIG. 3) of one or more DSDs 304, characterizing excursions from "normal" operational behavior of each corresponding DSD 304, and which may be translated and/or transformed into a different format, is transmitted out of the data center 302 in the form depicted as error data 310. Additionally or alternatively, fleet health manager 352 may repeatedly extract from the data center 302 and/or the data center 302 repeatedly pushes to fleet health manager 352, use metrics (or state metrics) largely originating from DSDs 304 and which correspond to the operational behavior pattern of one or more of the DSDs 304, such as a certain operational behavior that is the object of improvement or optimization (e.g., device throughput, for a non-limiting example). Note that the manner in which the fleet health manager 352 and the secure data center 302 may communicate and exchange information may vary from implementation to implementation. One such approach to the intercommunication between the secure data center 302 and the fleet health manager 352 is described and illustrated in U.S. patent application Ser. No. 17/333,007, entitled "FLEET HEALTH MANAGEMENT CORRECTIVE ACTION COMMUNICATION EXCHANGE" and filed on the same date herewith, the entire content of which is incorporated by reference in its entirety for all purposes as if fully set forth herein.

At block 404, data representing a particular excursion is input into a probabilistic decision network that characterizes a set of DSD operational metrics and certain DSD controller rules that represent internal controls of the DSD and corresponding conditional relationships among the operational metrics. For example, one or more of the error data 310 received by the fleet health manager 352 from the data center 302 (e.g., at block 402) is input to the probabilistic decision network 354 (FIG. 3) wherein, as described in more detail elsewhere herein, a set of DSD operational metrics 354a (FIG. 3) and certain DSD controller rules 354b (FIG. 3) that represent internal controls of the DSD 304 and corresponding conditional relationships among the operational metrics 354a are characterized. Additionally or alternatively, a particular use metric received by the fleet health manager 352 from the data center 302 (e.g., at block 402) is input to the probabilistic decision network 354.

At block 406, a respective likelihood that one or more possible causes was a contributing factor to the particular excursion is determined from the decision network. For example and as described in more detail elsewhere herein, from the decision network 354 the likelihood or relative probability that one or more possible causes was a contributing factor to the particular excursion is determined, e.g., by traversing the probabilistic graphical model backwards from the node that corresponds to the operational metric 354a that corresponds to the particular excursion associated with and reported out from the particular DSD 304. Additionally or alternatively, the likelihood or relative probability that one or more operational behaviors of the DSD 304 can be modified to improve the particular use metric is determined, e.g., by traversing the probabilistic graphical model backwards from the node that corresponds to the operational metric 354a that corresponds to the particular use metric associated with and reported out from the particular DSD 304.

At block 408, a corrective action for the particular excursion based on the determined likelihood of a particular cause of the one or more possible causes is determined. For example, fleet health manager 352 may take the most probable cause computed by traversal in one or more directions of the decision network 354, and match it to a suitable corrective action from the corrective action library 356 (FIG. 3). Additionally or alternatively, fleet health manager 352 may take the most probable operational behavior computed by traversal in one or more directions of the decision network 354, and match it to a suitable improvement action (e.g., from the corrective action library 356, or a comparable optimization library identifying possible DSD behavior optimizations).

At block 410, the corrective action is shared with the DSD for in-situ execution by the DSD. For example, fleet health manager 354 transmits corrective action 360 (FIG. 3) (or an improvement action, in the context of an optimization scenario) to the data center 302 for decoding (if applicable) and distribution by a host 306 (FIG. 3) to the particular DSD 304 within which the particular excursion occurred as represented in the received error data 310 (e.g., at block 402). In turn, the particular DSD 304 can match the corrective action with corresponding executable code of fundamental repair operations stored within the DSD 304 and execute that code embodying an in-situ repair to the DSD 304. Again note that the manner in which the fleet health manager 352 and the secure data center 302 may communicate and exchange information may vary from implementation to implementation, and that one such approach is described and illustrated in the incorporated U.S. patent application Ser. No. 17/333,007, entitled "FLEET HEALTH MANAGEMENT CORRECTIVE ACTION COMMUNICATION EXCHANGE".

Computing System Overview

One embodiment is related to the use of a computing system for implementing techniques described herein, in the form of a computer appliance. A computer appliance refers to a computing system with software or firmware that is specifically designed to provide a specific computing resource. The hardware and software are provided as an integrated product and may provide a turn-key solution for a particular application. Computer appliances are typically designed to not allow the customers to change the software loaded thereon, and the software may be encrypted for security. Note that another form of appliance, referred to as a virtual appliance, may have similar functionality to a dedicated hardware appliance but is distributed as a software virtual machine image.

Figure 5:
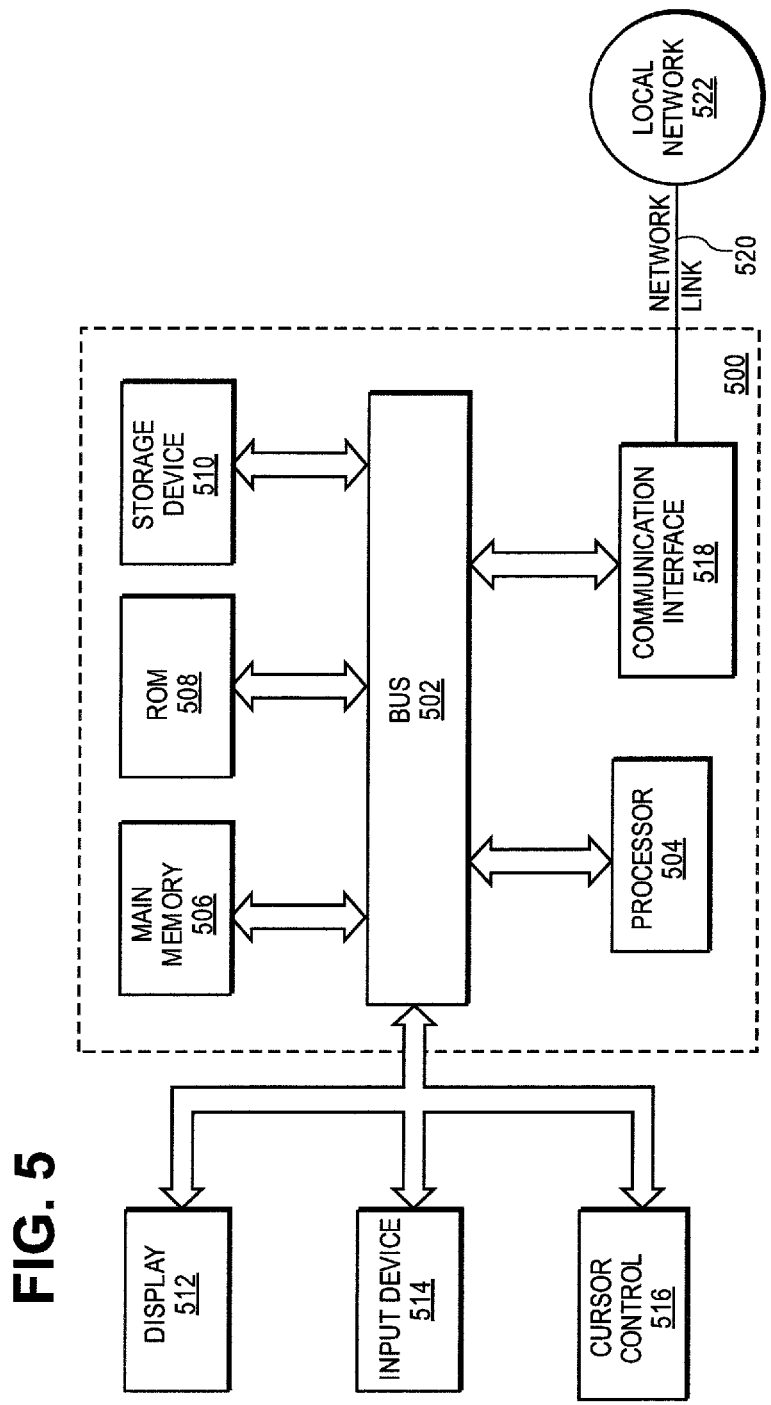
FIG. 5 is a block diagram illustrating a computing system upon which an embodiment may be implemented.

FIG. 5 is a block diagram that illustrates a computing system 500 upon which an embodiment may be implemented. Computing system 500 includes a bus 502 or other communication mechanism for communicating information, and a processor 504 coupled with the bus 502 for processing information. Computing system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computing system 500 further includes a read only memory (ROM) 508 or other static storage device coupled to bus 502 for storing static information and instructions for processor 504. A storage device 510, such as a hard disk drive (HDD) or a solid-state drive (SSD), is provided and coupled to bus 502 for storing information and instructions.

Computing system 500 may be coupled via bus 502 to a display 512 for displaying information to a user of computing system 500. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512.

According to one embodiment, the techniques described herein may be performed by computing system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry such as firmware or an application-specific integrated circuit (ASIC) may be used in place of or in combination with software instructions to implement embodiments. Thus, embodiments are not limited to any specific combination of hardware circuitry and software.

The terms "computer-readable medium" and "machine-readable medium" if used herein refer to any medium that participates in providing instructions to processor 504 for execution. Such a medium may take many forms, including non-volatile media and volatile media. Non-volatile media includes, for example, HDD(s) and/or SSD(s), such as storage device 510. Volatile media includes dynamic memory, such as main memory 506. Common forms of computer-readable media include, for non-limiting examples, a hard disk, magnetic tape or any other magnetic medium, a CD-ROM or any other optical medium, a RAM, a FLASH-EPROM or any other memory chip or circuitry, or any other medium from which a computer can read. Various forms of computer readable media may be involved in carrying one or more sequences of instructions to processor 504 for execution. For example, the instructions may initially be stored on a memory of a remote computer. The remote computer can load the instructions into its dynamic memory and send the instructions over a network such as network 522. A communication interface 518 of computing system 500 can receive the data from the network link 520 and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

As discussed, computing system 500 also includes the communication interface 518 coupled to bus 502. Communication interface 518 provides a two-way data communication coupling to the network link 520 that is connected to the network 522. For example, communication interface 518 may be a network interface card (NIC) to provide a data communication connection to the connected network 522. Wireless links may also be implemented. In any such implementation, communication interface 518 sends and receives electrical, electromagnetic, or optical signals that carry digital data streams representing various types of information. Network link 520 typically provides data communication through one or more networks to other data devices. Computing system 500 can send messages and receive data, including program code, through the network 522, network link 520, and communication interface 518. The received code may be executed by processor 504 as it is received, and/or stored in storage device 510, or other non-volatile storage for later execution.

Hard Disk Drive Configuration

As discussed, embodiments may be used in the context of a data storage system in which multiple data storage devices (DSDs) such as hard disk drives (HDDs) are employed. Thus, in accordance with an embodiment, a plan view illustrating an HDD 100 is shown in FIG. 1A to illustrate exemplary operating components.

Figure 1A:
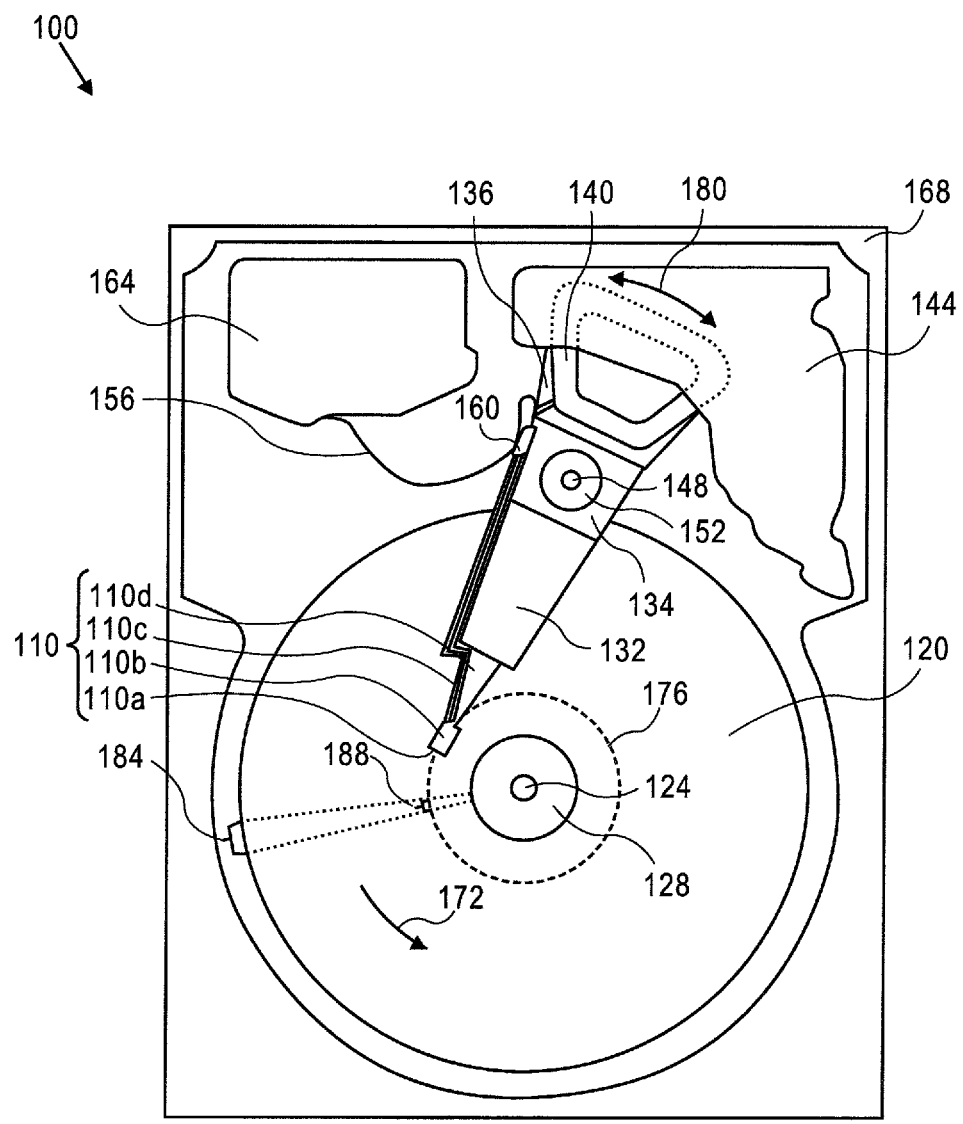
FIG. 1A is a plan view illustrating a hard disk drive (HDD), according to an embodiment.

FIG. 1A illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Solid State Drive Configuration

Figure 1B:
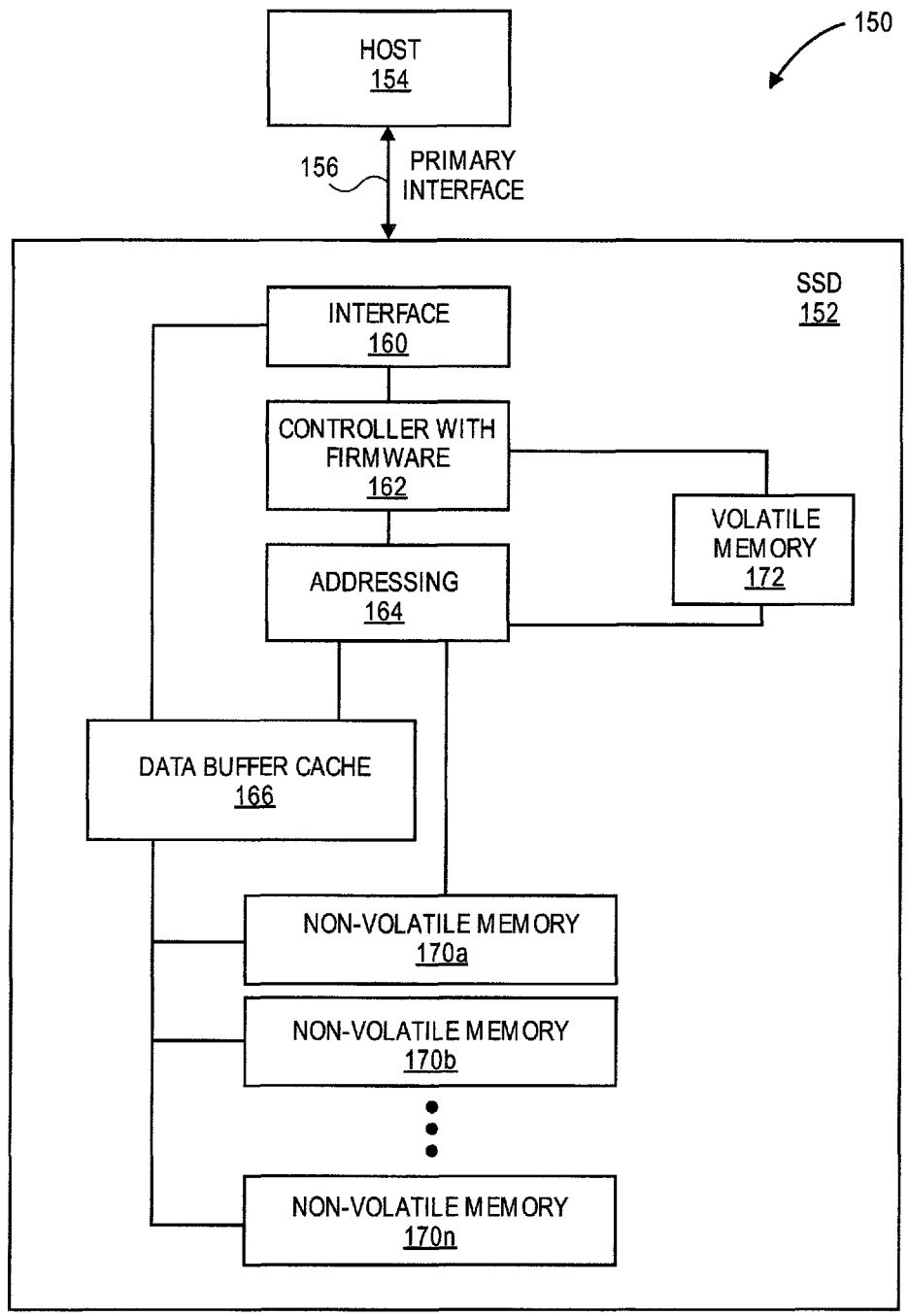
FIG. 1B is a block diagram illustrating a solid-state drive (SSD), according to an embodiment.

As discussed, embodiments may be used in the context of a data storage system in which multiple data storage devices (DSDs) such as solid-state drives (SSDs) are employed. Thus, FIG. 1B is a block diagram illustrating an example operating context with which embodiments of the invention may be implemented. FIG. 1B illustrates a generic SSD architecture 150, with an SSD 152 communicatively coupled with a host 154 through a primary communication interface 156. Embodiments are not limited to a configuration as depicted in FIG. 1B, rather, embodiments may be implemented with SSD configurations other than that illustrated in FIG. 1B. For example, embodiments may be implemented to operate in other environments that rely on non-volatile memory storage components for writing and reading of data.

Host 154 broadly represents any type of computing hardware, software, or firmware (or any combination of the foregoing) that makes, among others, data I/O requests or calls to one or more memory device. For example, host 154 may be an operating system executing on a computer, a tablet, a mobile phone, or generally any type of computing device that contains or interacts with memory, such as host 350 (FIG. 3). The primary interface 156 coupling host 154 to SSD 152 may be, for example, a storage system's internal bus or a communication cable or a wireless communication link, or the like.

The example SSD 152 illustrated in FIG. 1B includes an interface 160, a controller 162 (e.g., a controller having firmware logic therein), an addressing 164 function block, data buffer cache 166, and one or more non-volatile memory components 170a, 170b-170n.

Interface 160 is a point of interaction between components, namely SSD 152 and host 154 in this context, and is applicable at the level of both hardware and software. This enables a component to communicate with other components via an input/output (I/O) system and an associated protocol. A hardware interface is typically described by the mechanical, electrical and logical signals at the interface and the protocol for sequencing them. Some non-limiting examples of common and standard interfaces include SCSI (Small Computer System Interface), SAS (Serial Attached SCSI), and SATA (Serial ATA).

An SSD 152 includes a controller 162, which incorporates the electronics that bridge the non-volatile memory components (e.g., NAND (NOT-AND) flash) to the host, such as non-volatile memory 170a, 170b, 170n to host 154. The controller is typically an embedded processor that executes firmware-level code and is an important factor in SSD performance.

Controller 162 interfaces with non-volatile memory 170a, 170b, 170n via an addressing 164 function block. The addressing 164 function operates, for example, to manage mappings between logical block addresses (LBAs) from the host 154 to a corresponding physical block address on the SSD 152, namely, on the non-volatile memory 170a, 170b, 170n of SSD 152. Because the non-volatile memory page and the host sectors are different sizes, an SSD has to build and maintain a data structure that enables it to translate between the host writing data to or reading data from a sector, and the physical non-volatile memory page on which that data is actually placed. This table structure or "mapping" may be built and maintained for a session in the SSD's volatile memory 172, such as DRAM (dynamic random-access memory) or some other local volatile memory component accessible to controller 162 and addressing 164. Alternatively, the table structure may be maintained more persistently across sessions in the SSD's non-volatile memory such as non-volatile memory 170a, 170b-170n.

Addressing 164 interacts with data buffer cache 166, in addition to non-volatile memory 170a, 170b-170n. Data buffer cache 166 of an SSD 152 typically uses DRAM as a cache, similar to the cache in hard disk drives. Data buffer cache 166 serves as a buffer or staging area for the transmission of data to and from the non-volatile memory components, as well as serves as a cache for speeding up future requests for the cached data. Data buffer cache 166 is typically implemented with volatile memory so the data stored therein is not permanently stored in the cache, i.e., the data is not persistent.

Finally, SSD 152 includes one or more non-volatile memory 170a, 170b-170n components. For a non-limiting example, the non-volatile memory components 170a, 170b-170n may be implemented as flash memory (e.g., NAND or NOR flash), or other types of solid-state memory available now or in the future. The non-volatile memory 170a, 170b-170n components are the actual memory electronic components on which data is persistently stored. The non-volatile memory 170a, 170b-170n components of SSD 152 can be considered the analogue to the hard disks in hard-disk drive (HDD) storage devices.

Furthermore, references herein to a data storage device may encompass a multi-medium storage device (or "multi-medium device", which may at times be referred to as a "multi-tier device" or "hybrid drive"). A multi-medium storage device refers generally to a storage device having functionality of both a traditional HDD (see, e.g., HDD 100) combined with an SSD (see, e.g., SSD 150) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A multi-medium storage device may be architected and configured to operate and to utilize the solid-state portion in a number of ways, such as, for non-limiting examples, by using the solid-state memory as cache memory, for storing frequently-accessed data, for storing I/O intensive data, for storing metadata corresponding to payload data (e.g., for assisting with decoding the payload data), and the like. Further, a multi-medium storage device may be architected and configured essentially as two storage devices in a single enclosure, i.e., a traditional HDD and an SSD, with either one or multiple interfaces for host connection.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicant(s) to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alpha-numeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A method for identifying a corrective action for a data storage device (DSD), the method comprising:
repeatedly receiving error data about excursions from normal operational behavior of a DSD;
inputting, into a probabilistic decision network, data based on the received error data and representing a particular excursion, wherein the probabilistic decision network characterizes (i) a set of DSD physical operational metrics as nodes and (ii) certain DSD controller rules as interconnections that represent (ii-a) internal algorithmic controls of the DSD and/or (ii-b) corresponding conditional relationships among the operational metrics; and
determining, from the probabilistic decision network and based on the input data, a respective likelihood that one or more possible causes was a contributing factor to the particular excursion.

2. The method of claim 1, further comprising:
determining a corrective action for the particular excursion based on the determined likelihood of a particular cause of the one or more possible causes.

3. The method of claim 2, further comprising:
sharing the corrective action with the DSD for in-situ execution by the DSD.

4. The method of claim 2, further comprising:
determining a likelihood that the particular excursion impacts future operational behavior of the DSD in a manner having a noticeable effect on a host of the DSD; and
wherein the determining the corrective action is performed only responsive to determining the likelihood of the noticeable effect.

5. The method of claim 1, wherein the DSD controller rules comprise internal algorithms used by a DSD controller to control the operational behavior of the DSD.

6. The method of claim 5, wherein:
the probabilistic decision network is characterized as a mathematical graph expressing the internal algorithms; and
the determining the respective likelihood of a possible cause includes traversing the graph backwards from the graphical node corresponding to the DSD operational metric corresponding to the particular excursion.

7. The method of claim 1, wherein the determining the respective likelihood of a possible cause includes expanding the context of the particular excursion by considering one or more prior probability distributions regarding one or more of the DSD operational metrics.

8. The method of claim 7, wherein at least one of the prior probability distributions is regarding a DSD operational metric corresponding to a same type of excursion as the particular excursion.

9. The method of claim 7, wherein at least one of the prior probability distributions is regarding a DSD operational metric corresponding to a different type of excursion from the particular excursion.

10. The method of claim 1, wherein the data representing the particular excursion corresponds to an excursion of a first DSD, the method further comprising:
inputting data representing a second particular excursion, corresponding to an excursion of a second DSD, into the probabilistic decision network; and
wherein the determining the respective likelihood regarding the excursion of the first DSD is based additionally on the data representing the second particular excursion of the second DSD.

11. The method of claim 1, wherein the data representing the particular excursion corresponds to a first excursion from a particular first process of normal operational behavior of a first DSD according to a relevant first time scale corresponding to the first process, the method further comprising:
inputting, into the probabilistic decision network, data representing a second excursion from a particular second process of normal operational behavior of a second DSD according to a relevant second time scale corresponding to the second process, wherein the first time scale differs from the second time scale; and
wherein the determining the respective likelihood is based at least in part on the data represented in both the first time scale and the second time scale, synchronized over a common time period.

12. A non-transitory computer-readable medium storing one or more sequences of instructions which, when executed by one or more processors, cause performance of:
repeatedly receiving error data about excursions from normal operational behavior of a data storage device (DSD);
inputting, into a probabilistic decision network, data based on the received error data and representing a particular excursion, wherein the probabilistic decision network characterizes (i) a set of DSD physical operational metrics as nodes and (ii) certain DSD controller rules as interconnections that represent (ii-a) internal algorithmic controls of the DSD and/or (ii-b) corresponding conditional relationships among the operational metrics;
determining, from the probabilistic decision network, a respective likelihood that one or more possible causes was a contributing factor to the particular excursion; and
determining a corrective action for the particular excursion based on the determined likelihood of a particular cause of the one or more possible causes.

13. The computer-readable medium of claim 12, wherein the one or more sequences of instructions, when executed by the one or more processors, cause further performance of:
sharing the corrective action with the DSD for in-situ execution by the DSD.

14. The computer-readable medium of claim 12, wherein the DSD controller rules comprise internal algorithms used by a DSD controller to control the operational behavior of the DSD.

15. The computer-readable medium of claim 14, wherein:
the probabilistic decision network is characterized as a mathematical graph expressing the internal algorithms; and
the determining the respective likelihood of a possible cause includes traversing the graph backwards from the graphical node corresponding to the DSD operational metric corresponding to the particular excursion.

16. The computer-readable medium of claim 12, wherein the determining the respective likelihood of a possible cause includes expanding the context of the particular excursion by considering one or more prior probability distributions regarding one or more of the DSD operational metrics.

17. The computer-readable medium of claim 12, wherein the data representing the particular excursion corresponds to an excursion of a first DSD, and the one or more sequences of instructions, when executed by the one or more processors, cause further performance of:
inputting data representing a second particular excursion, corresponding to an excursion of a second DSD, into the probabilistic decision network; and
wherein the determining the respective likelihood regarding the excursion of the first DSD is based additionally on the data representing the second particular excursion of the second DSD.

18. The computer-readable medium of claim 12, wherein the data representing the particular excursion corresponds to a first excursion from a particular first process of normal operational behavior of the DSD according to a relevant first time scale corresponding to the first process, and the one or more sequences of instructions, when executed by the one or more processors, cause further performance of:
inputting, into the probabilistic decision network, data representing a second excursion from a particular second process of normal operational behavior of the DSD according to a relevant second time scale corresponding to the second process, wherein the first time scale differs from the second time scale; and
wherein the determining the respective likelihood is based at least in part on the data represented in both the first time scale and the second time scale, synchronized over a common time period.

19. A data storage device (DSD) fleet health management appliance comprising:
means for executing machine-executable instructions; and
means for storing one or more sequences of machine-executable instructions which, when executed by the means for executing, cause performance of:
repeatedly receiving error data about excursions from normal operational behavior of a DSD and/or use metrics about normal operational behavior of the DSD;
inputting, into a probabilistic decision network, data based on the received error data and representing a particular excursion and/or a particular use metric, wherein the probabilistic decision network characterizes (i) a set of DSD physical operational metrics as nodes and (ii) certain DSD controller rules as interconnections that represent (ii-a) internal algorithmic controls of the DSD and/or (ii-b) corresponding conditional relationships among the operational metrics;
determining, from the probabilistic decision network, a respective likelihood that one or more possible causes was a contributing factor to the particular excursion and/or a respective likelihood that one or more operational behaviors of the DSD can be modified to improve the particular use metric;

determining a corrective action for the particular excursion based on the determined likelihood of a particular cause of the one or more possible causes and/or an improvement action for the particular use metric based on the determined likelihood of a particular operational behavior of the one or more operational behaviors; and sharing the corrective action and/or improvement action with the DSD for in-situ execution by the DSD.

20. The appliance of claim 19, wherein the one or more sequences of machine-executable instructions comprise encrypted instructions.

\* \* \* \* \*